J. P. WESTMORELAND AND J. D. BULLINGTON.
TURNTABLE.
APPLICATION FILED FEB. 4, 1921.

1,402,554. Patented Jan. 3, 1922.
2 SHEETS—SHEET 1.

Inventor
James P. Westmoreland
John D. Bullington
By Hardway & Cathey
Attorneys

J. P. WESTMORELAND AND J. D. DULLINGTON.
TURNTABLE.
APPLICATION FILED FEB. 4, 1921.
1,402,554.
Patented Jan. 3, 1922.
2 SHEETS—SHEET 2.
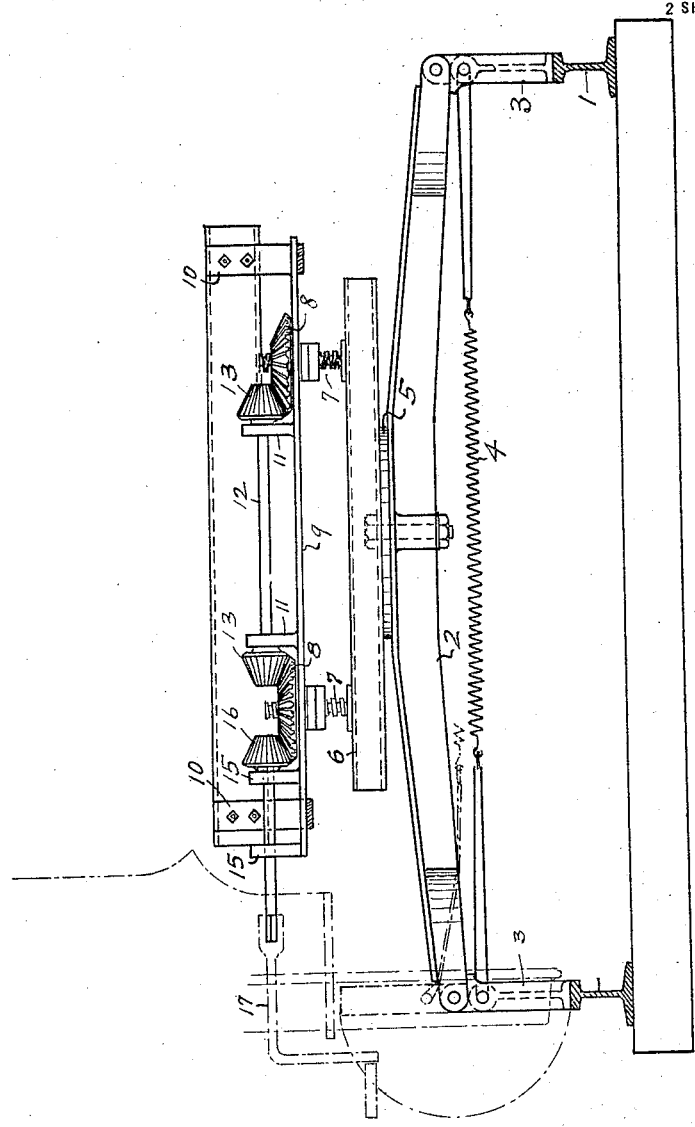
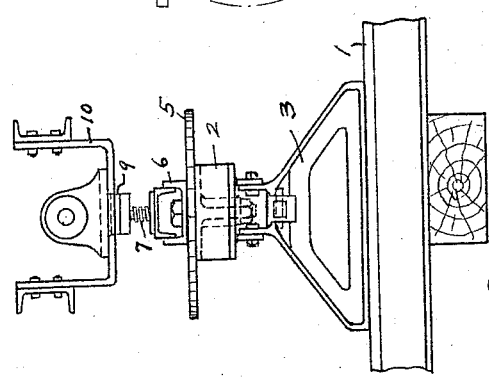

UNITED STATES PATENT OFFICE.

JAMES P. WESTMORELAND AND JOHN D. BULLINGTON, OF ONALASKA, TEXAS.

TURNTABLE.

1,402,554.     Specification of Letters Patent.     Patented Jan. 3, 1922.

Application filed February 4, 1921. Serial No. 442,505.

*To all whom it may concern:*

Be it known that we, JAMES P. WESTMORELAND and JOHN D. BULLINGTON, citizens of the United States, residing at Onalaska, in the county of Polk and State of Texas, have invented certain new and useful Improvements in a Turntable, of which the following is a specification.

This invention relates to new and useful improvements in a turn table.

One object of the invention is to provide a turn table which is designed to be attached to and carried beneath a motor car which runs on a railway track and whereby the car can be easily elevated until its wheels clear the rails and then turned around.

With the above and other objects in view the invention has particular relation to certain novel features of construction, operation and arrangement of parts, an example of which is given in this specification and illustrated in the accompanying drawings, wherein:—

Figure 2 is a front view, and

Figure 3 is a side view.

Figure 1:
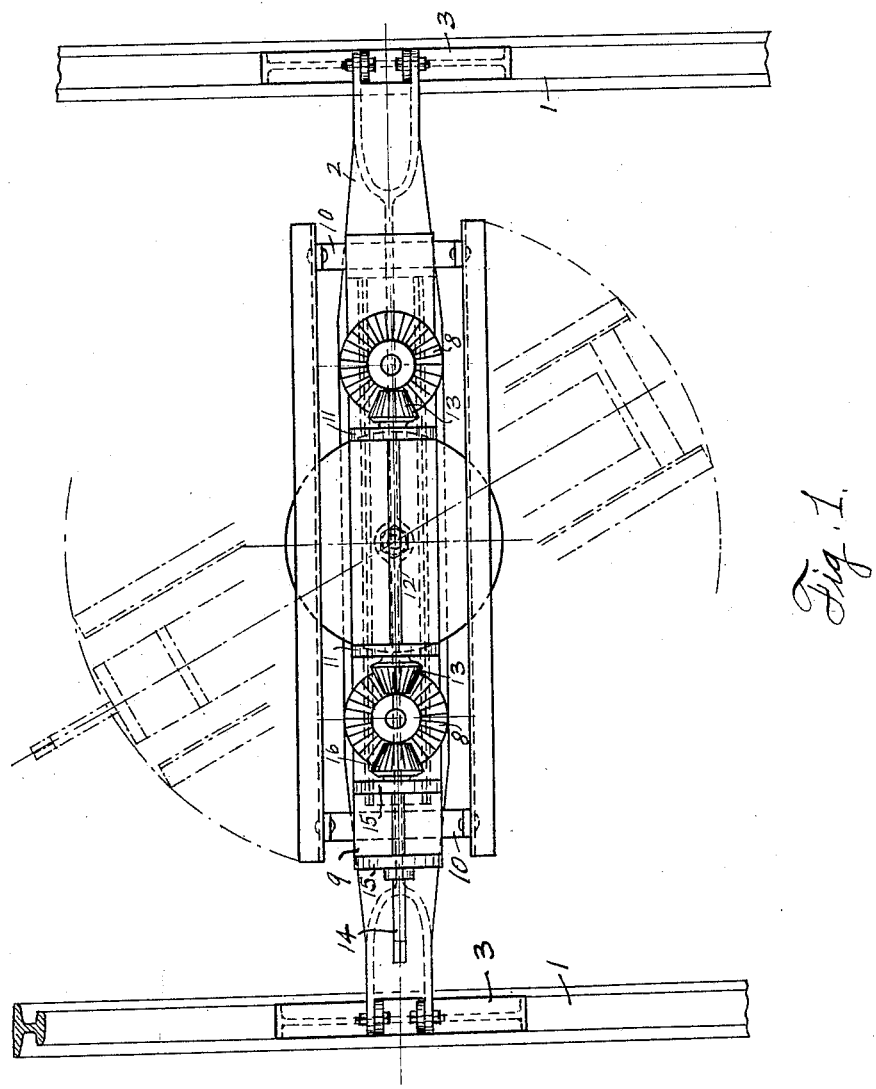
Figure 1 is a plan view of the device.

Referring now more particularly to the drawings, the numerals 1, 1 designate the rails of a railway track whereon the car travels.

The numeral 2 refers to the base of the turntable and is preferably formed of an I-beam. Pivoted to the ends of the base are the pedestals 3, 3, which are turned downwardly, to rest on the rails, when it is desired to elevate the car but which are turned up underneath the running boards, when not in use, as shown on the left hand side of Figure 2. These pedestals are connected by means of a yieldable tie 4 which holds them in upturned position and prevents them from rattling. Rotatably mounted on the base, at its center, is the fifth wheel 5 which carries a cross beam or channel 6. Upstanding from the respective ends of this cross beam are the coarsely threaded standards 7, 7, onto which the bevel pinions 8, 8 are threaded. These pinions have a swivelling connection with the bar 9, whose ends carry the U-shaped brackets 10, 10. These brackets are secured at their upper ends to the frame of the car.

The bar 9 has the spaced bearings 11, 11 in which the shaft 12 rotates and this shaft has the pinions 13 fixed on its respective ends and which mesh with the pinions 8.

A drive shaft 14 is provided, which works in the bearings 15, 15 at one end of the bar 9 and the inner end of this shaft has a pinion 16 fixed thereon, which is in mesh with one of the pinions 8.

A crank 17 is used to rotate the shaft 14.

In order to elevate the motor car the pedestals are turned down and the crank 17 is turned which will operate through the gearing described to turn the pinions 8 and run them upwardly on the standards 7. This will lift the car and it may then be easily swung around into reversed position. The car is then lowered onto the track by a reverse rotation of the crank. The pedestals are then turned upwardly and the car is ready to move. This turn table has been specially constructed for use on a Ford motor car but may be used as well on other types of vehicles.

What we claim is:—

1. A turn table for motor cars, including a base, pedestals pivoted thereto and aligned above the respective rails of a railway track, a yieldable member connecting said pedestals, a rotatable member mounted on the base, and means connected to said member and to the car, through which the car may be elevated or lowered relative to the base.

2. A turn table for motor cars, including a base, pedestals carried thereby, a rotatable member mounted on the base, threaded standards upstanding from said members, pinions threaded onto said standards, a connecting bar attached to the car and with which the pinions have a swivelling connection, and means for rotating the pinions.

In testimony whereof we have signed our names to this specification in the presence of two subscribing witnesses.

JAMES P. WESTMORELAND.
    JOHN D. BULLINGTON.

Witnesses:
    WOODY ROSSER,
    C. G. WOODWARD.